Feb. 20, 1968 G. A. SHAFFER, JR., ET AL 3,369,291
METHOD OF MAKING REED SWITCHES
Filed March 14, 1963 4 Sheets-Sheet 3

INVENTORS:
GEORGE A. SHAFFER, JR.,
LEONARD R. CAMPBELL &
BY HENRY L. BLUST

William A. Zalesak
ATTORNEY

INVENTORS:
GEORGE A. SHAFFER, JR.
LEONARD R. CAMPBELL &
BY HENRY L. BLUST

William A. Zalesak
ATTORNEY

3,369,291
METHOD OF MAKING REED SWITCHES

George A. Shaffer, Jr., Union, Leonard R. Campbell, New Brunswick, and Henry L. Blust, Lyndhurst, N.J., assignors to Radio Corporation of America, a corporation of Delaware
Filed Mar. 14, 1963, Ser. No. 265,126
1 Claim. (Cl. 29—622)

This invention relates to the manufacture of reed switches and particularly to a method of fabricating glass reed switches having uniformly and accurately positioned reeds.

A known type of reed switch comprises a pair of reeds of magnetic material projecting into a tube, usually of glass. The outer ends of the reeds project through and are sealed vacuum tight through opposite end walls of the glass tube to serve as terminals of the switch. Within the glass tube, the two reeds are positioned in overlapped, spaced apart relation.

The reeds are generally thin and resilient, and the switches are operated by applying a magnetic field thereto of a strength sufficient to cause the overlapping portions of the magnetic reeds to contact one another. In proper operation of such switches the reeds contact one another in response to magnetic fields of preselected strengths, and the reeds spring apart on collapse of the fields. To assure response of the switches in a contacting movement to such preselected magnetic field strengths, the spacing or gap between the reeds is accurate to a fine degree. In one type of reed switch to which the method of this invention has particular application, for example, the gap between the reeds is controlled to within two ten-thousands of an inch (.0002").

Two problems are now generally recognized as militating against uniform and accurate spacing of the reeds in a finished switch. One problem relates to the measurement and the setting of the gap between the reeds. Accurate gap setting has been found difficult to accomplish because of the relatively small size of the reeds, the extremely high gap accuracy required, and the fact that the gap between the reeds is set while the reeds are within an optically distorting cylindrical glass envelope.

The other problem relates to the effects of the reed switch sealing process on the reed spacing. Although the reeds are annealed prior to their assembly into reed switches, it is found that some residual stress remains in the reeds. During heating of the reeds in the sealing process some random warping or distortion of the reeds occurs. Further, upon contact of the molten glass with the reeds and subsequent cooling of the glass and the reeds, it is believed that the hardening glass induces stresses in the reeds which also tend to distort and displace them. In any event, random warping and displacement of the reeds after the gap therebetween has been set changes the gap setting and hence the operating characteristics of the reed switch in an unpredictable manner.

An object of this invention is to provide an improved and novel method for uniformly and accurately fabricating glass reed switches.

A further object of this invention is to provide an improved and novel method of accurately positioning the reeds of glass reed switches with respect to each other which overcomes the distorting effects on the initial reed positioning produced by the sealing process.

For achieving these objects, a method is provided which may utilize a pair of chucks adapted to hold the reeds in overlapped relation within an open ended glass tube, with portions of the reeds extending outwardly through the open ends of the tube. The method comprises, in one exemplary form, moving one of the reeds towards the other of the reeds and into sufficiently firm contact therewith to provide an electrical contact between the reeds, and an electric current is caused to pass through the reeds. The movable reed is then moved away from the other reed to a point where the electric contact between the reeds is first broken as indicated by the interruption of the current flow therebetween, to provide a reference or indicia point from which measurement may be made. The movable reed is further moved away from the other reed a preselected distance from the indicia or reference point. In this way, an accurate gap between the reeds is established. The reeds are then sealed within the ends of the glass tube, the sealing rate of the movable reed, however, proceeding at a slower rate than the sealing rate of the other reed, whereby the other reed is heated, sealed, and cooled prior to the sealing of the movable reed. In this manner, the other reed is firmly fixed in position and is not subject to subsequent heating, displacement and warping. Thereafter, and during the sealing of the movable reed, the gap between the reeds is reset. The gap resetting is done after the glass of the tube has collapsed onto and around the movable reed and has started to cool, but while the glass is still plastic. The second gap setting is performed in the same manner as the first gap setting, and is so timed with respect to the sealing of the movable reed that very shortly after the conclusion of the second gap setting step the glass cools from a plastic to a hardened state, whereby the reed is firmly and rigidly supported in its accurately regapped position.

By means of the above-described method, as will be more fully described hereinafter, glass reed switches having extremely accurate reed spacings may be simply, uniformly, and inexpensively fabricated.

Figure 4:
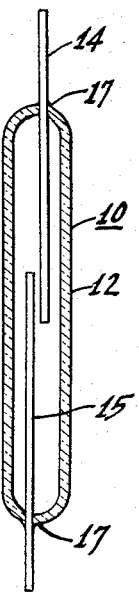
FIG. 4 is a sectional view of a glass reed switch that may be made by the method of this invention.
Figure 5:
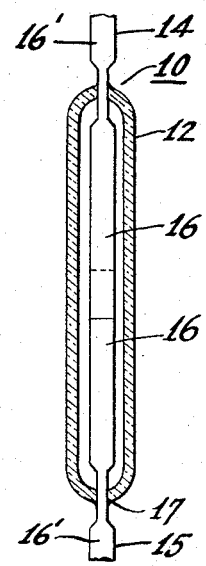
FIG. 5 is a side elevation in section of the reed switch shown in FIG. 4.

Referring first to FIGS. 4 and 5, a reed switch 10 comprises a glass envelope 12 into which extend a pair of elongated electrical connectors or reeds 14 and 15 made of magnetic material such as a gold plated nickel-iron alloy. The reeds are formed from wire stock flattened at one end 16 to provide contacting portions between the reeds, and flattened at the other end 16' to provide terminals for the reed switch 10. Preferably, the reeds have been annealed prior to incorporation into the reed switch to eliminate the strains formed therein during the operation of flattening contacts 16 and terminals 16'. It is noted that even though annealed, the reeds often retain residual strains therein. The reeds 14 and 15 extend through glass-to-metal seals 17 at the ends of the envelope 12. The inner ends of the reeds 14 and 15 are close enough together so that a magnetic field of preselected strength when applied to the reed switch 10 by a surrounding coil (not shown) will cause the reeds to contact each other. Within the glass envelope 12 is a protective non-corrosive atmosphere such as nitrogen or hydrogen.

Figure 1:
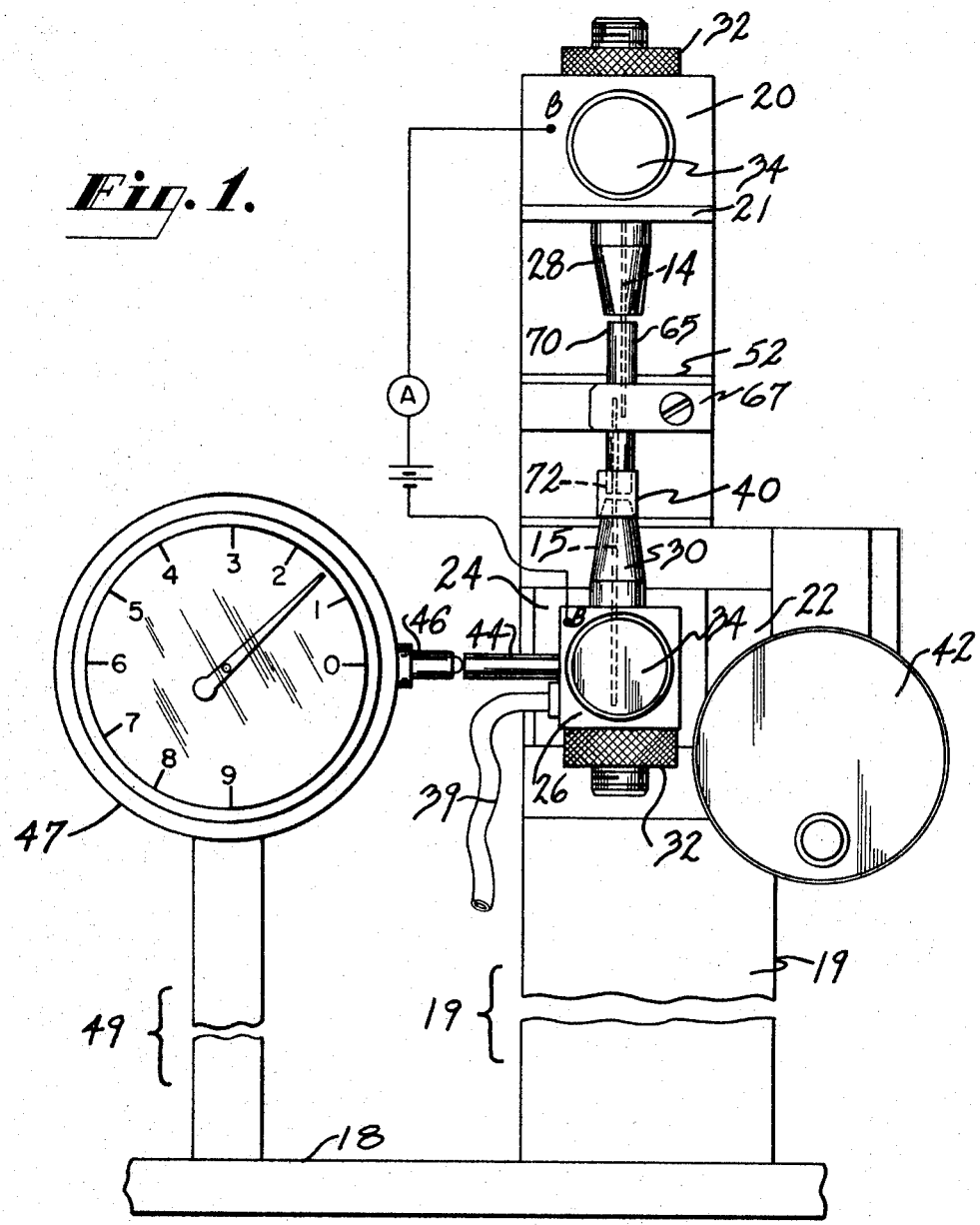
FIG. 1 is a front elevation of apparatus which may be used in the practice of this invention with the reed switch parts mounted on the apparatus, but with portions of the apparatus removed for greater clarity.
Figure 2:
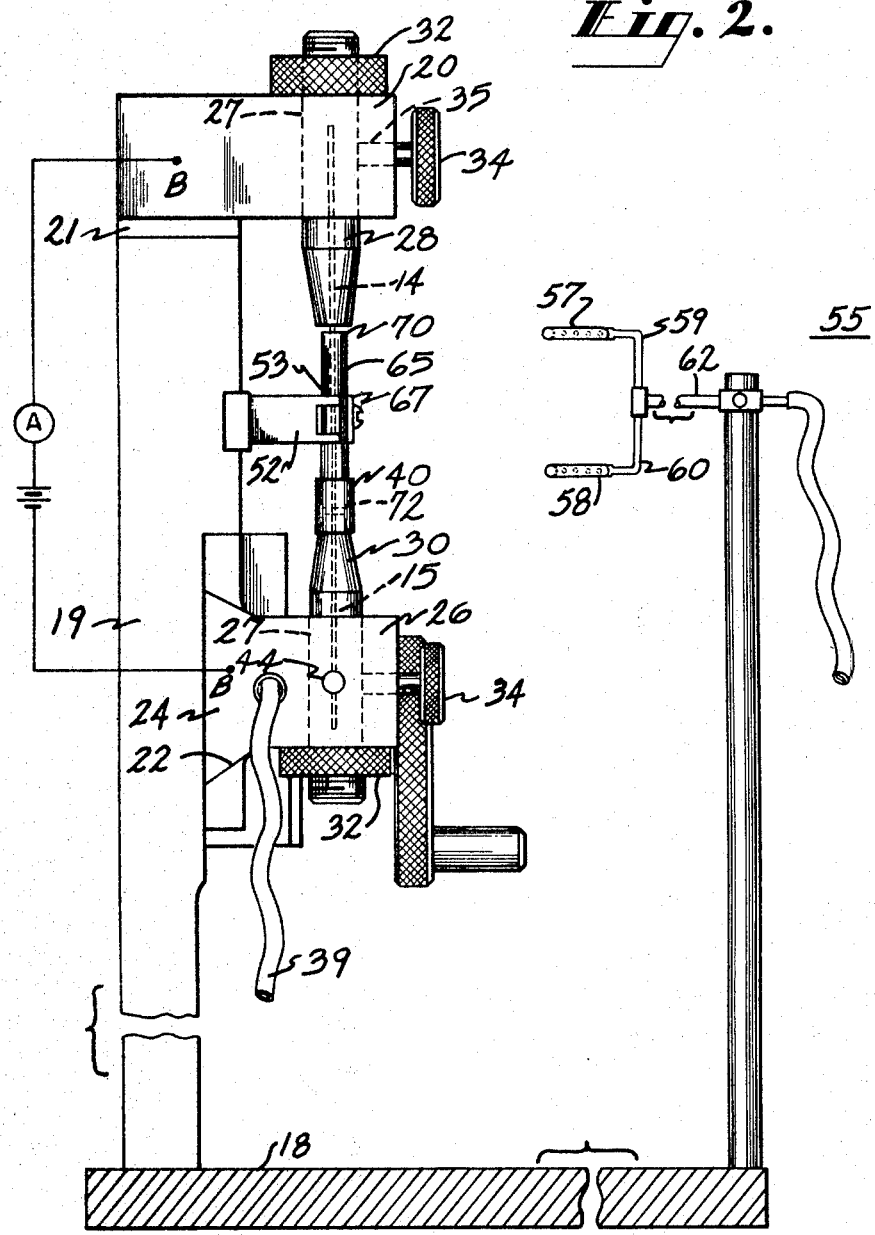
FIG. 2 is a side elevation of the apparatus shown in FIG. 1 with the dial indicator gage shown in FIG. 1 removed for greater clarity.

Apparatus which may be employed for making the reed switches 10 by the method of this invention is shown in FIGS. 1 and 2. A stationary base 18 is provided on which a vertical standard 19 is fixed. An electrically conductive clamp 20 is fixed to vertical standard 19 at the upper portion thereof, an insulator block 21 being provided to electrically insulate clamp 20 from standard 19. A horizontally extending dovetail groove 22 is formed in the standard 19 below stationary clamp 20. A dovetail slide 24 slidably fits within dovetail groove 22 and includes as a part thereof an electrically conductive clamp 26. Clamps 20 and 26 have vertically extending openings 27 (FIG. 2) therethrough adapted to receive electrically conductive reed chucks 28 and 30. Chucks 28 and 30 have similar openings 38 therein (only one being shown in FIG. 3) adapted to snugly and accurately receive end portions 16' of the reeds 14 and 15, respectively. One end of each chuck 28 and 30 is threaded and has a nut 32 thereon. The vertical position of chucks 28 and 30 may thus be controlled with respect to clamps 20 and 26 by means of adjustment of nuts 32. Chucks 28 and 30 are removable from clamps 20 and 26 to facilitate loading of the reeds 14 and 15 therein, and may be clamped securely within clamps 20 and 26 by means of screws 34 threaded into openings 35 in the side of clamps 20 and 26.

Lower chuck 30 (FIG. 3) has a passageway 37 therethrough communicating at one end thereof with the opening 38 in chuck 30, and communicating at its other end with a passageway (not shown) in clamp 26 communicating in turn with a hose 39 (FIGS. 1 and 2) coupled to a source of purging gas (not shown). Valve means (not shown) are also provided for controlling the flow of the purging gas. Mounted on the top end of lower chuck 30 is a tubular shield 40. The purpose of shield 40 will appear hereinafter.

Slide 24, clamp 26, and chuck 30 mounted on clamp 26 are slidable within dovetail groove 22. A crank 42 is provided connected through suitable gearing means (not shown) to effect sliding motion of slide 24 back and forth within dovetail groove 22. A rod 44 (FIG. 1) is mounted on and extends horizontally outwardly from clamp 26. Rod 44 engages plunger 46 of a suitable machinist's dial indicator gage 47 mounted on support 49 fixed to base 18 for accurately indicating the position of clamp 26 within groove 22.

A voltage source indicated by the conventional schematic showing for a battery is connected across clamps 20 and 26 at the points marked B (FIG. 1), and an ammeter A, schematically illustrated, is also provided for indicating the flow of current between clamps 20 and 26 when they are electrically connected.

Figure 3:
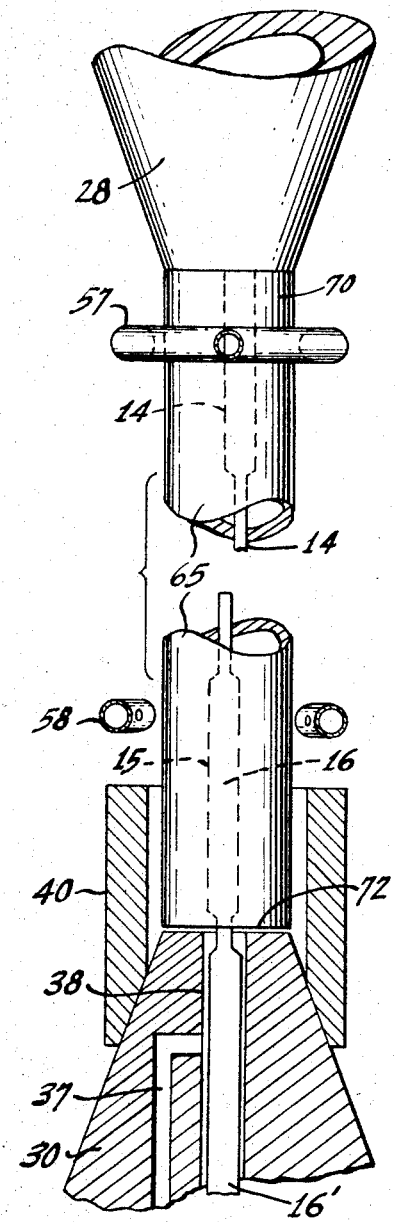
FIG. 3 is an enlarged view of a portion of the apparatus shown in FIG. 1, portions thereof being broken away.

A glass tubing support 52 having a V-shape notch 53 along the edge thereof is mounted on standard 19 between clamps 20 and 26. A burner assembly 55 (FIG. 2) comprising a pair of identical annular burners 57 and 58 are held in parallel spaced position by pipings 59 and 60 which supply gas to the two burners 57 and 58. Support means 62 is provided for moving each of the burners 57 and 58 to the left, from the position as viewed in FIG. 2, to the position shown in FIG. 3 where the burners 57 and 58 are disposed around a glass tubing 65, and back to the position shown in FIG. 2 where the burners are completely to the right of the clamps 20 and 26 and the glass tubing support 52. A sector of each annular burner is omitted providing an opening in each burner by means of which the annular burners may be disposed about the glass tubing 65 for sealing the ends thereof. Although not shown, support means 62 permits simultaneous movement of burners 57 and 58 to positions disposed around the ends of tubing 65, as shown in FIG. 3, and separate removal of the burners from these positions. Also, burners 57 and 58 are oxygen and hydrogen fed, and valve means are provided in the oxygen line for burner 58 whereby the temperature of the burner 58 flame may be controlled, for reasons to be described.

As shown in FIGS. 1 and 2, the glass tubing 65 is held in the V-notch 53 of support 52 by spring clip 67. The outer ends of reeds 14 and 15 are individually held in the chucks 28 and 30, respectively, the chucks being secured within clamps 20 and 26. The inner ends of the reeds overlap within the glass tubing 65 (FIG. 1). The glass tubing 65 is supported in the notch 53 of tubing support 52. The position of the tubing 65 is such that the lower end 72 of the tubing (see FIG. 3) is closely adjacent the upper end of lower chuck 30 and is within shield 40. Upper end 70 of glass tubing 65 is positioned adjacent upper chuck 28, as shown.

A method of operation of the apparatus described is as follows: at the beginning of a cycle the burner assembly 55 is positioned to the right as viewed in FIG. 2. Chucks 28 and 30 have been removed from clamps 20 and 26, and reeds 14 and 15 are inserted in the openings 38 therein. Openings 38 are provided with stops therein (not shown) wherein the length of the reeds extending outwardly of chucks 28 and 30 is fixed. Further, the openings 38 are rectangular in cross section so that the flattened and rectangularly cross sectioned reeds 14 and 15 are properly angularly oriented with respect to the chucks. The glass tubing 65 is clipped in place on support 52 by clip 67. Crank 42 is rotated to cause slide 24 to move to the left, as viewed in FIG. 1 to dispose clamp 26 to the left of and out of registry with clamp 20. This is done to prevent axial or butting engagement of the reeds 14 and 15 with each other. Chucks 28 and 30 are then inserted into clamps 20 and 26 through the top and bottom thereof, respectively, and clamped in place by screws 34. Within glass tubing 65, the reeds are disposed in face-to-face, overlapping, and spaced apart relation. Thereafter, the gap between the reeds is set.

The method of setting the gap between the reeds is as follows: crank 42 is rotated to cause slide 24 to move to the right, as viewed in FIG. 1, and in a direction normal to the faces of the reeds until lower reed 15 is moved into electrical contacting relation with upper reed 14. Such contact is indicated by the flow of current through the reeds as indicated by the ammeter referred to. Since the reeds may have a slight film of dirt or particles of dirt or the like thereon, it is sometimes necessary to move the lower reed 15 into firm contact with upper reed 14 to press the reeds tightly together to provide electrical contact. Sometimes the resilient reeds are visibly bowed before electrical contact is established.

Thereafter, crank 42 is rotated in the opposite direction to move lower reed 15 in a direction away from upper reed 14 and to a point where the electrical contact between the reeds is first broken, as indicated by the interruption of current flow therebetween. As the operator rotates crank 42, he watches the ammeter dial 47, and ceases rotating the crank and moving the reed 15 on current interruption. At this point, the reeds are generally also out of physical contact with one another since the passage of current between the reeds, it is believed, cleans the surfaces of the reeds so that a pressure contact therebetween is no longer needed to provide electrical contact.

The point where the electrical contact between the reeds is first broken is thereafter used as a reference or indicia point from which the gap between the reeds is set, as will be described. An advantage of establishing this reference point, in the manner described, is that observation of the reeds is not required and the presence of the light distorting glass tubing 65 around the reeds has no effect upon the accuracy of gap setting. Further, the reference point is found for each pair of reeds of each reed switch made, the reference point ordinarily being at a different reading on the indicator dial 47 from the making of one switch to another. In this sense, each switch is custom made, the position of the reference point being dependent upon the particular dimensions and physical properties of the particular pair of reeds being spaced.

The location of the reference point, that is, the position of slide 24 within dovetail groove 22 is accurately shown by indicator dial 47 and is noted by the operator. Thereafter, crank 42 is further rotated to move lower reed 15 away from the reference point and away from upper reed 14 a selected distance for setting the correct gap between the reeds. This latter movement is accurately measured by the operator by adding (or subtracting) the selected distance to the reading on the indicator dial 47 to derive a target reading. Then the operator continues the crank rotation until the target reading is reached. As known, movements as small as one ten-thousandth of an inch (.0001″) are readily and clearly shown on such dials, whereby great accuracy may be achieved and operator fatigue reduced.

After this initial gap setting, the purging gas is supplied through hose 39, through opening 38 in chuck 30 and through glass tube 65 for purging the atmospheric gases from tubing 65. Due to the presence of shield 40 and the spacing between the lower end 72 of glass tubing 65 from the upper end of chuck 30, the purging gas is directed to flow upwardly through shield 40 and also along the outside surface of glass tubing 65 for reasons to be described.

Thereafter, the ends of glass tubing 65 are sealed about reeds 14 and 15 passing therethrough. To accomplish the sealing operation, the burner assembly 55 is moved to the left, as viewed in FIG. 2, until the ends 70 and 72 of the tube 65 are centered in burners 57 and 58 as shown in FIG. 3. Burner 57 has a hotter flame than burner 58 and quickly seals the top end 70 of tube 65 onto and around reed 14. During this time the purging gas is directed by shield 40 onto the lower portion of glass tubing 65 heated by lower burner 58. The purging gas cools the lower end of the glass tubing thereby causing the sealing of the lower end of tubing 65 to proceed at a slower rate than the sealing of the upper end. During this time, the purging gas also flows upwardly and into tubing 65, and upon sealing of the upper end 70 thereof, the purging gas is trapped within glass tubing 65. Thereafter, burner 57 is moved to the right, as viewed in FIG. 2, and the upper seal and reed 14 are allowed to cool.

Figure 6:
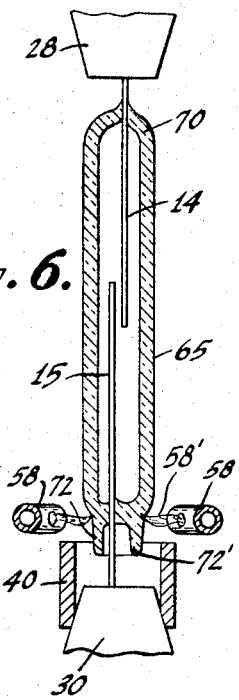
FIGS. 6 and 7 are enlarged views partially in section of a portion of the apparatus shown in FIG. 1 showing steps in the sealing of the movable reed through the glass envelope; and, FIG. 8 illustrates schematically an automatic apparatus which may be used in connection with the apparatus shown in FIGS. 1–3 for performing the method of this invention.

As shown in FIGS. 3 and 6, lower burner 58 is disposed about tube 65 at a position spaced from the lower end 72 thereof, which end 72 is received within shield 40. Shield 40 prevents the products of combustion from flame 58′ from burner 58 from entering the reed switch through the lower end 72 of tubing 65. It has been found that if such products of combustion enter the reed switch and are sealed therein, the operating characteristics of the reed switch may be adversely affected.

Figure 7:
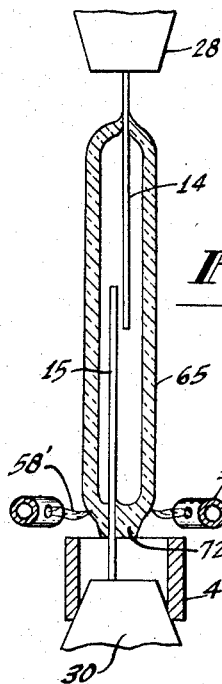

Shortly after the upper seal has cooled, the heated region at the lower end of tubing 65 collapses onto and hermetically seals the bottom of tubing 65 as shown in FIG. 6. Thereafter, the flow of the purging gas is shut off. End 72 of glass tubing 65 is no longer cooled by the flow of the purging gas and the temperature of the glass and reed 15 therethrough increases and causes the lower skirt 72 to "ball up" at the lower end 72 of tubing 65 as shown in FIG. 7. Thereafter, the oxygen fed to burner 58 is cut off whereby the temperature of the flame 58′ of burner 58 is reduced. Reed 15 and the glass around it immediately begin to cool, but at a rate controlled by burner 58. Thereafter, and before the sealing of reed 15 through glass tubing 65 is completed, the gap between reeds 14 and 15 is reset.

The regapping of the reeds is performed in the same manner as the initial gap setting of the reeds, but as mentioned, is performed while the sealing of the lower end 72 of tubing 65 is being made, and while the glass is still plastic. During the regapping, the lower reed is forced to move through the still hot and plastic glass. Shortly after the regapping step is completed, the glass hardens to firmly hold lower reed 15 in its regapped position.

If the second gap setting takes too long, the glass will harden and prevent movement of the reed before the gap is properly set. To prevent this, two gap settings are used rather than only a single gap setting during sealing. That is, when the reeds are first positioned wtihin glass tubing 65 by means of chucks 28 and 30, the spacing between the reeds may be very large. This is so because lower clamp 26 is moved out of alignment with clamp 20 prior to the mounting of chucks 28 and 30 into the clamps, as described. Thus, a large movement of the lower reed may be required in order to initially set the gap. Once the gap is initially set, the reeds are generally very close together (in one reed switch made according to this invention, the reed gap is .003 inch) and the required movement of the lower reed 15 during the second gap setting is considerably less than the movement required of the lower reed during the first gap setting. The small movement required of the lower reed 15 in the second gap setting permits the second gap setting to be done rapidly and before the molten glass fully hardens.

Depending upon the size of the reed switch being made, the amount of time available for the second gap setting operation varies. That is, this time depends upon the length of time the glass at the lower seal can be safely maintained in a plastic state without damage to the seal. For reed switches having a diameter of 0.115 inch, a length of .750 inch and a glass wall thickness of .012–.015 inch, it is found preferable that the glass at the lower end of the glass tubing be maintained in a plastic state no longer than 5–6 seconds during regapping. In view of this, it is preferable to provide automatic and rapid acting apparatus for setting the reed gap.

Figure 8:
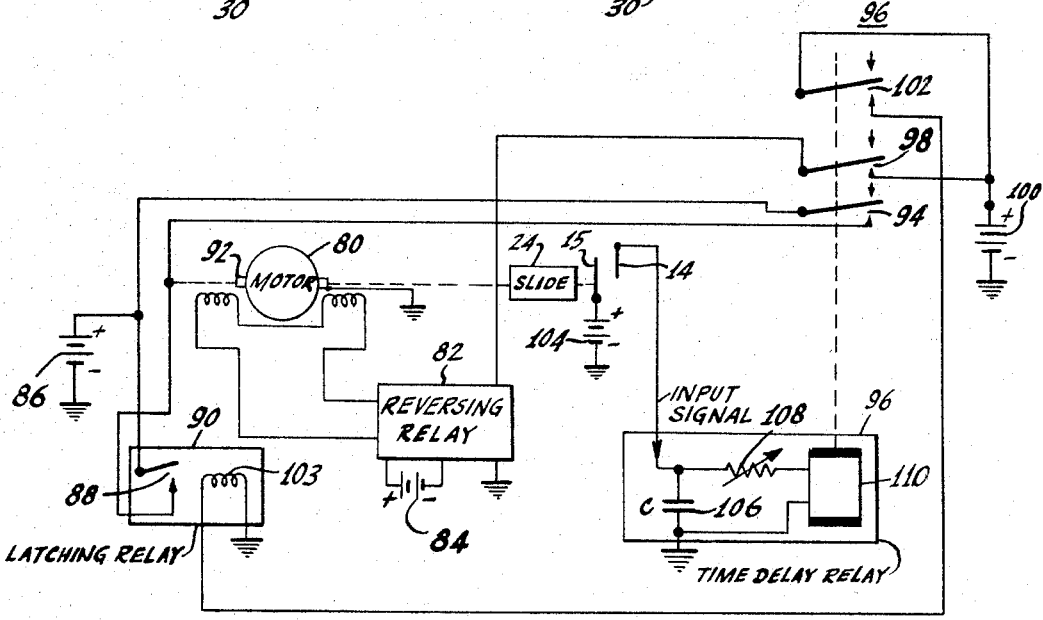

A suitable circuit for such automatic and rapid acting apparatus to use with the apparatus of FIGS. 1–3 is schematically illustrated in simplified form in FIG. 8. A reversible motor 80 has its shaft connected by suitable gearing to slide 24, slide 24 having reed 15 mounted thereon for movement to and away from reed 14. The field windings of the motor 80 are connected through the contacts of a reversing relay 82 to a source of field current 84. When the reversing relay 82 is not actuated, current flows through normally closed contacts in the reversing relay in one direction, and when current then flows through the armature 92 of the motor 80, the motor 80 drives in one direction. When the reversing relay 82 is actuated the polarity connection of the source 84 to the field windings is reversed to reverse the direction of field winding current, and the direction of drive of motor 80. A source 86 of armature current has one terminal to a common conductor, conventionally indicated as ground, and the other is connected through the contact 88 of a latching relay 90 to one terminal of the motor armature 92, the other terminal of which is grounded. The one terminal of the motor armature 92 is also connected through one set of normally open contacts 94 of a relay 96 to the armature supply 86. The relay 96 has a second set of normally open contacts 98 through which one terminal of a relay actuating source 100 is connected to the one terminal of the winding of the reversing relay 82, the other terminals of both source 100 and the winding of relay 82 being grounded. A third set of normally open contacts 102 of the relay 96 connect, when closed, the one terminal of the source 100 to the ungrounded terminal of the winding 103 of the latching relay 90. One terminal of a voltage source 104 is connected to the movable reed 15; the other terminal of source 104 is grounded. The fixed reed 14 is connected to one terminal of a capacitor 106, the other terminal of which is connected to ground. The capacitor 106 is connected in series with a variable resistor 108. The series circuit of capacitor 106 and resistor 108 is connected across the winding 110 of relay 96. The circuit of the winding 110 of relay 96 and capacitor 106 and resistor 108 may be part of a time delay relay.

To initiate a cycle of operation, the operator closes the contact 88 of the latching relay 90. Power from the armature source 86 is now applied to the armature 92 of the motor 80 and the motor rotates in a direction to move the slide 24 to carry the reed 15 into contact with the reed 14. Because the latching relay 90 now latches up, the motor continues to drive until the reeds 14 and 15 make electrical contact. At this time, current flows from the source 104 through the reeds 14 and 15, through the resistor 108 and the winding 110 of relay 96 to ground. The relay 96 is now actuated to close its three normally open contacts 94, 98 and 102. The closing of contact 102 applies current from the source 100 to the winding 102 of the latching relay 90 causing the latching relay to unlatch and the contact 88 to open. However, current continues to be applied to the armature 92 of motor 80 from the source 86 through the now closed contact 94 without change of direction of current flow. At the same time, current from the source 100 through the contact 98 actuates the reversing relay to reverse the direction of current in the field windings of motor 80. The motor 80 now quickly stops and reverses. Meanwhile, the capacitor 106 is quickly charged by source 104. The motor continues in its reversed direction separating the reeds 15 and 14 until the reeds break contact. From this moment on the current actuating the relay 96 is derived from the discharge of the capacitor 106 through the resistor 108 and the relay winding 110 to ground. When the discharge current falls to a critical value, the relay 96 snaps back to its initial condition with the contacts 94, 98 and 102 open. The armature current for the motor 80 is now interrupted as the contacts 94 open and the motor immediately stops. Known braking means may be employed to prevent coasting of the motor. The opening of contacts 98 causes the reversing relay 82 to return to its initial condition. The capacitor 106 continues to discharge and the circuit is rapidly ready for another cycle of operation.

The resistor 108 may be adjusted so that the critical value of current at which the relay 96 drops out occurs after a desired time delay corresponding to a selected distance of travel of the reed 15 from the reed 14 from the indicia position at which the reeds break contact. In this manner, accurate, automatic, and rapid gapping of the reeds may be provided.

It will be seen from the foregoing, that the reeds 14 and 15 are first positioned in overlapped and spaced apart relation within the glass tubing 65. Thereafter, the gap between the reeds is initially set. Since this gap setting will in all likelihood be affected by the subsequent sealing of the reeds, the purpose of the initial gap setting is to roughly set the reed gap so that there is only a small amount of movement of reed 15 during the regapping step. After the initial setting of the gap, the upper reed 14 is sealed through the top end of glass tubing 65 and allowed to cool. Because of the heat insulating characteristics of glass, the top end 70 of glass tubing 65 and reed 14 sealed therethrough will not be reheated upon sealing of the lower reed 15. Thus, upon cooling, upper reed 14 assumes its final shape and position within tubing 65 and is subject to substantially no subsequent warping or displacement. Having fixed the position of upper reed 14 it remains only to locate and fix lower reed 15 with respect thereto.

Lower reed 15 is thereafter sealed through the lower end 72 of glass tubing 65 and the gap between the reeds is reset while the sealing operation is not complete and the glass still plastic. The advantage of this is that during sealing of reed 15, and prior to regapping, the reed 15 reaches its maximum temperature, whereby the residual strains within the reed will relieve themselves. This will generally result in a slight distortion of the shape of the reed. The subsequent and relatively slow cooling of the reed 15 in the oxygen-less burner 58 flame tends to anneal the reed 15 and freeze it in its new shape. Thereafter, and after reed 15 has assumed its final shape, the reed is moved through the still plastic glass to reset the gap. Once the gap is reset, further cooling of the reed and the glass surrounding it will neither distort nor displace the reed. In this manner extremely accurate and uniformly spaced apart reeds may be provided in glass envelope reed switches.

It is clear that the sequence of steps described can be modified to a certain extent. Thus, for example, it is possible to seal the upper reed 14 prior to inital gapping, as above described, rather than after initial gapping. Also, other means for controlling the sealing rates of the upper and lower ends of glass tubing 65 than by control of the flow of the purging gas and the oxygen supply, will be apparent to those skilled in the art.

What is claimed is:
1. Method of fabricating a reed switch from parts including an open ended glass envelope and two reeds, comprising:
   (a) supporting said reeds in spaced apart, overlapped relation within said envelope,
   (b) adjusting the gap between said reeds to provide a desired spacing therebetween, said gap adjusting comprising:
      (1) moving one of said reeds into electrical contact with the other of said reeds,
      (2) completing an electrical circuit through said reeds,
      (3) moving said reeds apart until the circuit is broken to position said reeds apart at a reference positon, and
      (4) moving said reeds a selected distance relative to each other from said reference positon,
   (c) sealing one of said reeds through one end of said envelope,
   (d) then sealing the other of said reeds through said envelope, and then
   (e) readjusting the said gap between said members during the last-named sealing step.

References Cited
UNITED STATES PATENTS

| | | | |
|---|---|---|---|
| 2,882,648 | 4/1959 | Hougaard et al. | 29—155.5 |
| 3,268,317 | 8/1966 | Blust | 65—138 |
| 3,284,876 | 11/1966 | Buttel | 29—155.5 |
| 2,406,021 | 8/1946 | Little | 200—87 |
| 2,406,008 | 8/1946 | Ellwood et al. | 200—87 |
| 2,457,218 | 12/1948 | Ferrell | 200—87 |
| 2,506,414 | 5/1950 | Ellwood | 200—87 |
| 2,696,543 | 12/1954 | Ellwood | 200—87 |
| 2,289,830 | 7/1942 | Ellwood | 200—87 |
| 2,726,917 | 12/1955 | Tyler | 316—29 |

JOHN F. CAMPBELL, Primary Examiner.

CHARLES T. MOON, Examiner.

R. W. CHURCH, J. W. BOCK, Assistant Examiners.